United States Patent Office 3,655,671
Patented Apr. 11, 1972

3,655,671
1,2-DISUBSTITUTED BENZO[b]QUINOLIZINES
John T. Suh, Mequon, and Richard A. Schnettler, Milwaukee, Wis., assignors to Colgate-Palmolive Company, New York, N.Y.
No Drawing. Filed Sept. 8, 1969, Ser. No. 856,168
Int. Cl. C07d *39/00*
U.S. Cl. 260—288 R                                   8 Claims

ABSTRACT OF THE DISCLOSURE

The compounds are 1,2-disubstituted benzo[b]quinolizines which are useful as antihypertensive agents and central nervous system depressants. The compounds are also useful as intermediates in the preparation of pickling agents, wood preservatives and mothproofing agents. Representative of the compounds disclosed are 1-hydroxy-2-N-methylamino-1,3,4,6,11,11a - hexahydro - 2H - benzo-[b]quinolizine, and 1-hydroxy - 2 - N - (3,4 - dimethoxybenzyl) - N - methylamino-1,3,4,6,11,11a - hexahydro-2H-benzo[b]quinolizine.

DESCRIPTION OF THE INVENTION

The compounds of the present invention may be represented by the following formula:

wherein X and Y are the same or different members selected from hydrogen, hydroxy, a halogen such as bromo, chloro or fluoro, a lower alkoxy such as methoxy, ethoxy or propoxy, an aralkoxy such as benzyloxy or trifluoromethyl, and $R_1$ and $R_2$ are the same or different and are selected from hydrogen, a lower alkyl of 1 to 4 carbon atoms such as methyl, ethyl, isopropyl or butyl, a lower alkyl aminoalkyl such as dimethylaminopropyl, a phenyl-lower alkyl of 7 to 13 carbon atoms such as benzyl, phenethyl, phenylisopropyl or phenylbutyl, including nuclear-substituted phenyl-lower alkyls such as dimethoxybenzyl, p-chlorobenzyl, and the like, a cycloalkyl of 3 to 7 carbon atoms such as cyclopropyl, cyclopentyl and cyclohexyl, a cycloalkyl-lower alkyl in which the cycloalkyl contains 3 to 7 carbon atoms such as cyclopentylmethyl and cyclohexylmethyl, lower alkenyls of 3 to 5 carbon atoms such as allyl and lower alkynyl groups of 3 to 5 carbon atoms such as propargyl.

The basic starting materials for the compounds of the present invention are compounds of the following formula:

(II)

in which X and Y are as previously defined. These compounds may be prepared from the corresponding carbohydrazide which may in turn be prepared from the corresponding 1-hydroxy-2-carboethoxy derivatives which are prepared from the corresponding ketones. The ketones are known compounds. S. Archer, J. Org. Chem., 16, 430 (1951). The preparation of the starting materials may be illustrated as follows:

in which X and Y are as previously defined.

Representative of the starting materials which may be used are the following:

1,3,4,6,11,11a-hexahydro-2H-benzo[b]quinolizin
 [2,1,d]oxazolin-2-one,
8,9-dimethoxy-1,3,4,6,11,11a-hexahydro-2H-benzo
 [b]quinolizin[2,1,d]oxazolin-2-one,
8,9-dichloro-1,3,4,6,11,11a-hexahydro-2H-benzo
 [b]quinolizin[2,1,d]oxazolin-2-one,
8-trifluoromethyl-1,3,4,6,11,11a-hexahydro-2H-benzo
 [b]quinolizin[2,1,d]oxazolin-2-one,
9-trifluoromethyl-1,3,4,6,11,11a-hexahydro-2H-benzo
 [b]quinolizin[2,1,d]oxazolin-2-one,
8-fluoro-1,3,4,6,11,11a-hexahydro-2H-benzo[b]
 quinolizin[2,1,d]oxazolin-2-one,
9-fluoro-1,3,4,6,11,11a-hexahydro-2H-benzo[b]
 quinolizin[2,1,d]oxazolin-2-one,
8,9-dihydroxy-1,3,4,6,11,11a-hexahydro-2H-benzo[b]
 quinolizin[2,1,d]oxazolin-2-one, and
8,9-dibenzyloxy-1,3,4,6,11,11a-hexahydro-2H-benzo
 [b]quinolizin[2,1,d]oxazolin-2-one.

In the preferred practice of the invention the compounds in which $R_1$ and $R_2$ are hydrogen are prepared by treating the corresponding 1,3,4,6,11,11a-hexahydro-2H-benzo[b] quinolizin[2,1,d]oxazolin-2-one with concentrated sodium hydroxide to form the corresponding primary amine. The reaction may be illustrated as follows:

Representative of the compounds which may be prepared by the described process are the following:

1-hydroxy-2-amino-1,3,4,6,11,11a-hexahydro-2H-benzo
 [b]quinolizine,
8,9-dimethoxy-1-hydroxy-2-amino-1,3,4,6,11,11a-
 hexahydro-2H-benzo[b]quinolizine,
8,9-dichloro-1-hydroxy-2-amino-1,3,4,6,11,11a-
 hexahydro-2H-benzo[b]quinolizine,
8-trifluoromethyl-1-hydroxy-2-amino-1,3,4,6,11,11a-
 hexahydro-2H-benzo[b]quinolizine,
9-trifluoromethyl-1-hydroxy-2-amino-1,3,4,6,11,11a-
 hexahydro-2H-benzo[b]quinolizine,
8-fluoro-1-hydroxy-2-amino-1,3,4,6,11,11a-hexahydro-
 2H-benzo[b]quinolizine,
9-fluoro-1-hydroxy-2-amino-1,3,4,6,11,11a-hexahydro-
 2H-benzo[b]quinolizine, 8,9-dihydroxy-1-hydroxy-2-amino-1,3,4,6,11,11a-hexahydro-2H-benzo[b]quinolizine, and
8,9-dibenzyloxy-1-hydroxy-2-amino-1,3,4,6,11,11a-hexahydro-2H-benzo[b]quinolizine.

The compounds in which $R_1$ is hydrogen and $R_2$ is methyl are prepared by treating the corresponding oxazolinone derivative with lithium aluminum hydride in a suitable solvent, such as tetrahydrofuran, under reflux conditions. The process may be illustrated as follows:

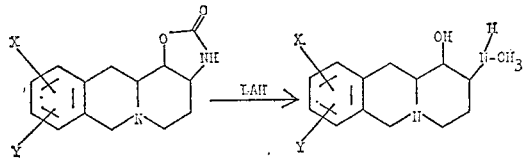

in which X and Y are as previously described.
Representative of the compounds which may be prepared by the described process are the following:

1-hydroxy-2-N-methylamino-1,3,4,6,11,11a-hexahydro-2H-benzo[b]quinolizine,
8,9-dimethoxy-1-hydroxy-2-N-methylamino-1,3,4,6,11,11a-hexahydro-2H-benzo[b]quinolizine,
8,9-dichloro-1-hydroxy-2-N-methylamino-1,3,4,6,11,11a-hexahydro-2H-benzo[b]quinolizine,
8-trifluoromethyl-1-hydroxy-2-N-methylamino-1,3,4,6,11,11a-hexahydro-2H-benzo[b]quinolizine,
9-trifluoromethyl-1-hydroxy-2-N-methylamino-1,3,4,6,11,11a,-hexahydro-2H-benzo[b]quinolizine,
8-fluoro-1-hydroxy-2-N-methylamino-1,3,4,6,11,11a-hexahydro-2H-benzo[b]quinolizine,
9-fluoro-1-hydroxy-2-N-methylamino-1,3,4,6,11,11a-hexahydro-2H-benzo[b]quinolizine,
8,9-dihydroxy-1-hydroxy-2-N-methylamino-1,3,4,6,11,11a-hexahydro-2H-benzo[b]quinolizine, and
8,9-dibenzyloxy-1-hydroxy-2-N-methylamino-1,3,4,6,11,11a-hexahydro-2H-benzo[b]quinolizine.

The compounds in which one of $R_1$ or $R_2$ are methyl and the other is other than hydrogen are preferably prepared from the previously described monomethyl compound. In the preferred practice the monomethyl derivative is dissolved or suspended in benzene to which has been added potassium carbonate, to which is added a suitable halide. The mixture is then refluxed until the reaction is complete, preferably about 15 hours. The process may be illustrated as follows:

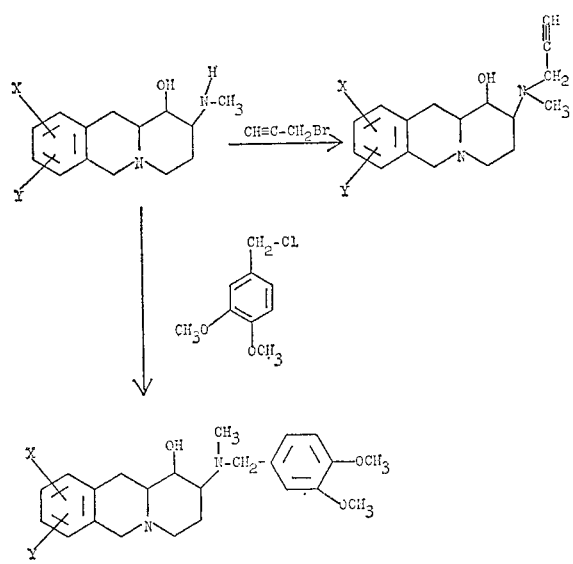

in which X and Y are as previously described.
In addition to the illustrated halides a wide variety of similar reactants may be employed to make the corresponding derivatives. Representative of the halides which may be employed are the following:

3,4-dimethoxybenzyl chloride,
p-chlorobenzyl chloride,
phenethyl bromide,
propargyl bromide,
allyl chloride,
benzyl chloride,
N,N-dimethylaminopropyl chloride,
N,N-diethylaminopropyl chloride,
N-methyl-N-benzylaminopropyl chloride, and
N-ethyl-N-benzylaminobutyl chloride.

Representative of the compounds, which may be prepared by the above described reaction are the following:

1-hydroxy-2-N-(3,4-dimethoxybenzyl)-N-methylamino-1,3,4,6,11,11a-hexahydro-2H-benzo[b]quinolizine,
1-hydroxy-2-(N-methyl-N-proparglyamino)-1,3,4,6,11-11a-hexahydro-2H-benzo[b]quinolizine,
1-hydroxy-2-(2'-N,N-dimethylaminoethylamino)-1,3,4,6,11,11a-hexahydro-2H-benzo[b]quinolizine,
8,9-dichloro-1-hydroxy-2-(2'-N,N-dimethylaminoethylamino)-1,3,4,6,11,11a-hexahydro-2H-benzo[b]quinolizine,
8-trifluoromethyl-1-hydroxy-2-(2'-N,N-dimethylaminoethylamino)-1,3,4,6,11,11a-hexahydro-2H-benzo[b]quinolizine,
1-hydroxy-2-(2'-N,N-diethylaminopropylamino)-1,3,4,6,11,11a-hexahydro-2H-benzo[b]quinolizine,
8,9-dihydroxy-1-hydroxy-2-(2'-N,N-diethylaminopropylamino)-1,3,4,6,11,11a-hexahydro-2H-benzo[b]quinolizine,
9-fluoro-1-hydroxy-2-(2'-N,N-diethylaminopropylamino)-1,3,4,6,11,11a-hexahydro-2H-benzo[b]quinolizine,
1-hydroxy-2-(2'-N-methyl-N-benzylaminopropylamino)-1,3,4,6,11,11a-hexahydro-2H-benzo[b]quinolizine,
8,9,-dibenzoyloxy-1-hydroxy-2-(2'-N-methyl-N-benzylaminopropylamino)-1,3,4,6,11,11a-hexahydro-2H-benzo[b]quinolizine,
9-trifluoromethyl-1-hydroxy-2-(2'-N-methyl-N-benzylaminopropylamino)-1,3,4,6,11,11a-hexahydro-2H-benzo[b]quinolizine,
1-hydroxy-2-(2'-N-ethyl-N-benzylaminopropylamino)-1,3,4,6,11,11a-hexahydro-2H-benzo[b]quinolizine,
8,9-dichloro-1-hydroxy-2-(2'-N-ethyl-N-benzylaminopropylamino)-1,3,4,6,11,11a-hexahydro-2H-benzo[b]quinolizine,
8-fluoro-1-hydroxy-2-(2'-N-ethyl-N-benzylaminopropylamino)-1,3,4,6,11,11a-hexahydro-2H-benzo[b]quinolizine,
1-hydroxy-2-(2'-N,N-dimethylaminopropylamino)-1,3,4,6,11,11a-hexahydro-2H-benzo[b]quinolizine,
8,9-ditrifluoromethyl-1-hydroxy-2-(2'-N,N-dimethylaminopropylamino)-1,3,4,6,11,11a-hexahydro-2H-benzo[b]quinolizine, and
9-chloro-1-hydroxy-2-(2'-N,N-dimethylaminopropylamino)-1,3,4,6,11,11a-hexahydro-2H-benzo[b]quinolizine.

The compounds of the present invention may be used as intermediates in the preparation of such agents as pickling agents according to U.S. Pats. 2,425,320 and 2,606,155. The compounds also form fluosilicic acid addition salt which are useful as wood preservatives and mothproofing agents according to U.S. Pats. 1,915,334 and 2,075,359.

The compounds of the present invention also demonstrate pharmacological activity primarily in effect upon the central nervous system. The behavior of mice receiving 100 mg./kg. of 8,9-dimethoxy-1-hydroxy-2-amino-1,3,4,6,11,11a - 2H - benzo[b]quinolizine intraperitoneally was characterized by symptoms of a general central nervous system depression such as decreased awareness and irritability.

The behavior of mice receiving 30 mg./kg. of the following compounds intraperitoneally was characterized by symptoms of a general central nervous system stimulation such as increased awareness and irritability:

1-hydroxy-2-N,N-dimethylamino-1,3,4,6,11,11a-hexahydro-2H-benzo[b]quinolizine, and
1-hydroxy-2-(N-methyl-N-proparglyamino)-1,3,4,6,11,11a-hexahydro-2H-benzo[b]quinolizine.

As a result of the behavioral test the above compounds were all found to have $LD_{50}$'s in excess of 55 mg/kg. The behavioral tests were conducted in accordance with the procedure set forth by Irwin in "Animal and Clinical Pharmacologic Techniques in Drug Evaluation," J. H. Nodine and P. E. Siegler, ed., Year Book Publishers, Inc. (1964) pp. 36–54.

When intended for pharmaceutical use the compounds and the acid addition salts of the compounds which are capable of forming such salts are preferably combined with one or more suitable diluents and formed into unit dosage forms for oral or parenteral administration such as tablets, capsules or solutions. Unit dosage forms will generally contain from 10 to 100 mg. of the active ingredients. The daily dosage of the compound to be administered to a patient will be conditioned upon many factors such as age and weight of the patient, other medication and, of course, the severity of his condition. However, generally speaking, the daily dose of the active ingredient will not exceed 55 mg./kg. of the patient's body weight.

The acid addition salts of the compounds of this invention may be produced by contacting the free base with a suitable organic or inorganic acid such as hydrochloric, sulfuric, phosphoric, maleic, fumaric and citric acid in a suitable mutual solvent.

The following examples are presented to illustrate this invention:

Example 1.—8,9-dimethoxy-2-carbethoxy-3,4,6,11,11a-pentahydro-2H-benzo[b]quinolizin-1-one To a suspension of 9.24 g. (0.212 mole) of 55% sodium hydride in 100 ml. of toluene there is slowly added 40.2 g. (0.1 mole) of ethyl N-(γ-carbethoxypropyl)-6,7-dimethoxy - 1,2,3,4-tetrahydroisoquinoline-3-carboxylate. A few drops of ethanol are added and the mixture stirred at 50° C. When the reaction has started, the heat is removed and the mixture stirred two hours, cooled, and made acid with dilute hydrochloric acid. The solid is collected, suspended in water, and made basic with sodium bicarbonate, extracted with ether and dried. Removal of solvent affords 8,9-dimethoxy-2-carbethoxy-3,4,6,11,11a-pentahydro-2H-benzo[b]quinolizin - 1 - one as a yellow solid. A small sample recrystallized from petroleum ether melts at 120–121°.

Analysis.—Calcd. for $C_{18}H_{23}NO_5$ (percent): C, 64.84; H, 6.95; N, 4.20. Found (percent): C, 64.72; H, 7.15; N, 4.20.

Example 2.—1-hydroxy-2-carboethoxy-1,3,4,6,11,11a-hexahydro-2H-benzo[b]quinolizine 2-carbethoxy-3,4,11,11a - tetrahydro - 2H - benzo[b]quinolizin-1(6H)-one (10.0 g., 0.0366 mole) is dissolved in 100 ml. ethanol and shaken in the presence of 1.0 g. platinum dioxide at 50 p.s.i. hydrogen for 15 hours. The solvent is evaporated to give 10.0 g. of a yellow oil which is dissolved in 25 ml. benzene and diluted with 20 ml. petroleum ether. Crystallization occurs to give 1-hydroxy-2-carboethoxy - 1,3,4,6,11,11a - hexahydro-2H-benzo[b]quinolizine as a colorless solid, M.P. 124–126°.

Analysis.—Calcd. for $C_{16}H_{21}NO_3$ (percent): C, 69.79; H, 7.69; N, 5.09. Found (percent): C, 69.79; H, 7.90; N, 5.06.

The mother liquor (7.70 g.) is placed on 250 g. silica gel and eluted with benzene:ethyl ether:ethyl acetate (1:1:3). After the initial yellow color has transversed the column, 25 ml. fractions are taken. Fractions 15–25 contain the above material. Fractions 36–80 are combined and crystallized from benzene:petroleum ether to give a second material, M.P. 136–139°.

Analysis.—Found (percent): C, 70.31; H, 8.09; N, 5.09.

The mother liquor from the second factor is concentrated and on standing gives the third compound, M.P. 103–105°.

Analysis.—Found (percent): C, 69.63; H, 7.44; N, 5.11.

Example 3.—1-hydroxy-2-carbohydrazide-1,3,4,6,11,11a-hexahydro-2H-benzo[b]quinolizine In 30 ml. ethanol is dissolved 3.94 g. (0.0143 mole) 1 - hydroxy-2-carboethoxy - 1,3,4,6,11,11a - hexahydro-2H - benzo[b]quinolizine (M.P. 127°) and 5.0 g. hydrazine (85%). The mixture is heated on the steambath for 19 hours and the solvent partially evaporated, cooled, and 1-hydroxy-2-carbohydrazide - 1,3,4,6,11,11a-hexahydro-2H-benzo[b]quinolizine in the form of a solid is collected. Upon recrystallization from ethanol a sample is obtained that melts at 216–218°.

Analysis.—Calcd. for $C_{14}H_{19}N_3O_2$ (percent): C, 64.34; H, 7.33; N, 16.08. Found (percent): C, 64.31; H, 7.26; N, 15.87.

Example 4.—1-hydroxy-2-carbohydrazide-1,3,4,6,11,11a-hexahydro-2H-benzo[b]quinolizine The mother liquor (15.0 g.) from Example 2 is refluxed with 15 g. hydrazine in 200 ml. ethanol for 15 hours. The solvent is evaporated and the solid crystallized from water to give 1-hydroxy-2-carbohydrazide-1,3,4,6,11,11a-hexahydro - 2H - benzo[b]quinolizine as a white solid, M.P. 254–257°.

Analysis.—Calcd. for $C_{14}H_{19}N_3O_2$ (percent): C, 64.34; H, 7.33; N, 16.08. Found (percent): C, 64.56; H, 7.23; N, 16.11.

Example 5.—8,9-dimethoxy-1-hydroxy-2-carbethoxy-1,3,4,6,11,11a-hexahydro-2H-benzo[b]quinolizine In 250 ml. ethanol is dissolved 12.2 g. (0.0368 mole) 8,9-dimethoxy-2-carbethoxy-3,4,11,11a - tetrahydro - 2H-benzo[b]quinolizin - 1(6H) - one and 1.0 g. platinum dioxide suspended. The mixture is shaken with hydrogen at 40 p.s.i. for 24 hours. The solid which crystallizes from the solution is filtered along with the platinum, washed into dilute hydrochloric acid and filtered. The solution is basified to give a white solid which is recrystallized from ethanol to give 8,9-dimethoxy-1-hydroxy-2-carbethoxy-1,3,4,6,11,11a - hexahydro-2H-benzo[b]quinolizine as white crystals, M.P. 175–178°.

Analysis.—Calcd. for $C_{18}H_{25}NO_5$ (percent): C, 64.43; H, 7.51; N, 4.18. Found (percent): C, 64.37; H, 7.45; N, 4.26.

On standing the concentrated mother liquor yields a solid which is chromatographed over silica gel ($CHCl_3$:$Et_2O$:EtOH; 5:5:0.2) to give a white solid, M.P. 118–120°.

Analysis.—Found (percent): C, 64.66; H, 7.55; N, 4.15.

Example 6.—8,9-dimethoxy-1-hydroxy-2-carbohydrazide-1,3,4,6,11,11a-hexahydro-2H-benzo[b]quinolizine In 100 ml. ethanol is dissloved 11.26 g. (0.0377 mole) 8,9 - dimethoxy-1-hydroxy-2-carbethoxy - 1,3,4,6,11,11a-hexahydro-2H-benzo[b]quinolizine and 20 ml. hydrazine hydrate (85%). The mixture is refluxed 4 hours, cooled and solvent removed to give 8,9-dimethoxy-1-hydroxy-2-carbohydrazide-1,3,4,6,11,11a - hexahydro - 2H - benzo[b]quinolizine as a white solid. The material is recrystallized from water, M.P. 217–219°.

Analysis.—Calcd. for $C_{16}H_{23}N_3O_4$ (percent): C, 59.79; H, 7.21; N, 13.08. Found (percent): C, 59.90; H, 7.40; N, 13.09.

Example 7.—1,3,4,6,11,11a-hexahydro-2H-benzo[b]-quinolizin[2,1,d]oxazolin-2-one

In 2 ml. acetic acid is dissolved 0.50 g. (0.0019 mole) 1-hydroxy-2-carbohydrazide - 1,3,4,6,11,11a - hexahydro-2H-benzo[b]quinolizine, the mixture is cooled to 0° C. and sodium nitrite (0.172 g., 0.0025 mole) in 1 ml. water is added. The mixture is stirred at 0° for 15 minutes. Concentrated sodium hydroxide is added to precipitate the azide. The solid (0.27 g.) is collected on the funnel and dried, transferred to 10 ml. ethanol, heated to reflux for 2.5 hours, solvent evaporated to give 1,3,4,6,11,11a-hexahydro-2H-benzo[b]quinolizin[2,1,d]oxazolin - 2 - one as a white solid. The material upon recrystallization from ethanol melts at 223–224°.

Analysis.—Calcd. for $C_{14}H_{16}N_2O_2$ (percent): C, 68.83; H, 6.60; N, 11.47. Found (percent): C, 68.74; H, 6.98; N, 11.39.

Example 8.—8,9-dimethoxy-1,3,4,11,11a-hexahydro-2H-benzo[b]quinolizin[2,1,d]-oxazolin-2-one In 21 ml. 3 N hydrochloric acid is dissolved 6.16 g. (0.0192 mole) 8,9 - dimethoxy - 1 - hydroxy-2-carbohydrazide - 1,3,4,6,11,11a - hexahydro - 2H - benzo[b]-quinolizine and the mixture cooled to 0° C. Sodium nitrite (1.321 g., 0.0192 mole) in 2 ml. water is added dropwise after which the mixture is stirred at 0° C. for 45 minutes. Ethanol (100 ml.) is added and the mixture refluxed 30 minutes, cooled and allowed to crystallize. A solid is collected, M.P. 251–253°. The free base is prepared by reaction with aqueous potassium carbonate, the solid 8,9-dimethoxy - 1,3,4,6,11,11a - hexahydro - 2H - benzo[b]-quinolizin[2,1,d]oxazolin-2-one is collected on the filter and dried, M.P. 269°.

Analysis.—Calcd. for $C_{16}H_{20}N_2O_4$ (percent): C, 63.13; H, 6.62; N, 9.21. Found (percent): C, 63.40; H, 6.15; N, 9.22.

Example 9.—1-hydroxy-2-N-methylamino-1,3,4,6,11,11a-hexahydro-2H-benzo[b]quinolizine In 70 ml. THF is suspended 1.82 g. (0.048 mole) LAH. To the system is slowly added 4.0 g. (0.0164 mole) 1,3,4,6,11,11a - hexahydro - 2H - benzo[b]quinolizin[2,1,d]-oxazolin-2-one. The mixture is refluxed 2 hours, cooled and the excess LAH decomposed with ethanol. The solvents are evaporated and the residue dissolved in dilute hydrochloric acid, made basic with potassium carbonate and extracted with chloroform, washed with water and dried. Evaporation of the solvent affords 1-hydroxy-2-N-methylamino - 1,3,4,6,11,11a - hexahydro - 2H -benzo[b]-quinolizine as a white solid which is recrystallized from water to give pale yellow crystals, M.P. 159–161°.

Analysis.—Calcd. for $C_{14}H_{20}N_2O$ (percent): C, 72.37; H, 8.68; N, 12.06. Found (percent): C, 72.73; H, 8.85; N, 12.13.

Example 10.—8,9-dimethoxy-1-hydroxy - 2 - N - methylamino-1,3,4,6,11,11a-hexahydro - 2H - benzo[b]quinolizine In 50 ml. tetrahydrofuran is suspended 1.05 g. (0.0255 mole) lithium aluminum hydride, slowly 8,9-dimethoxy-1,3,4,6,11,11a - hexahydro - 2H - benzo[b]quinolizin[2,1,d]-oxazolin-2-one is added as a dry powder, and the mixture refluxed 2 hours and allowed to stir overnight at room temperature. It is cooled, and excess lithium aluminum hydride destroyed with 20 ml. ethanol. The solvents are evaporated, dissolved in chloroform, washed with water, dried and solvent distilled to give 8,9-dimethoxy-1-hydroxy - 2 - N - methylamino - 1,3,4,6,11,11a-hexahydro-2H-benzo[b]quinolizine as a white solid. An analytical sample is recrystallized from isopropyl alcohol, M.P. 175–177°.

Analysis.—Calcd. for $C_{16}H_{24}N_2O_3$ (percent): C, 65.72; H, 8.27; N, 9.58. Found (percent): C, 65.90; H, 8.41; N, 9.34.

Example 11.—1-hydroxy-2-amino-1,3,4,6,11,11a-hexahydro-2H-benzo[b]quinolizine

In 30 ml. 4 N hydrochloric acid is dissolved 2.0 g. (0.0082 mole) 1,3,4,6,11,11a-hexahydro - 2H - benzo[b]-quinolizin[2,1,d]oxazolin-2-one. The solution is heated on a steambath for 15 hours, cooled and basified with concentrated sodium hydroxide solution. The solid is collected on the filter and dried to give 1-hydroxy-2-amino-1,3,4,6-11,11a-hexahydro - 2H - benzo[b]quinolizine as a white solid, M.P. 193–196°.

Analysis.—Calcd. for $C_{13}H_{18}N_2O$ (percent): C, 71.52; H, 8.31; N, 12.83. Found (percent): C, 71.83; H, 8.27; N, 12.99.

Example 12.—8,9-dimethoxy-1-hydroxy-2-amino-1,3,4,6,11,11a-hexahydro-2H-benzo[b]quinolizine In 65 ml. ethanol is dissolved 4.20 g. (0.0123 mole) 8,9-dimethoxy-1,3,4,6,11,11a - hexahydro - 2H-benzo[b]-quinolizin[2,1,d]oxazolin-2-one hydrochloride and 3.5 g. sodium hydroxide in 20 ml. water. The mixture is refluxed 4 hours, solvent evaporated, diluted with 50 ml. water and insoluble solid collected on the filter and recrystallized from water to give 8,9-dimethoxy - 1 - hydroxy - 2-amino-1,3,4,6,11,11a-2H-benzo[b]quinolizine as a solid, M.P. 204–206°.

Analysis.—Calcd. for $C_{15}H_{22}N_2O_3$ (percent): C, 64.72; H, 7.97; N, 10.07. Found (percent): C, 64.59; H, 8.56; N, 9.92.

Example 13.—1 - hydroxy - 2 - N - (3,4 - dimethoxybenzyl - N - methylamino - 1,3,4,6,11,11a - hexahydro-2H-benzo[b]quinolizine In 50 ml. benzene is suspended 10 g. potassium carbonate, 3.37 g. (0.0145 mole) 1-hydroxy - 2 - N - methyl-amino - 1,3,4,6,11,11a - hexahydro - 2H - benzo[b]quinolizine and 2.71 g. (0.0145 mole) 3,4-dimethoxybenzyl chloride. The mixture is refluxed 15 hours, cooled and filtered. The filtrate is concentrated and the residue recrystallized from benzene:petroleum ether (1:1) to give 1-hydroxy - 2 - N - (3,4 - dimethoxybenzyl) - N - methyl-amino - 1,3,4,6,11,11a - hexahydro - 2H - benzo[b]quinolizine as a white solid, M.P. 146–147°.

Analysis.—Calcd. for $C_{23}H_{30}N_2O_3$ (percent): C, 72.21; H, 7.91; N, 7.32. Found (percent): C, 72.38; H, 7.94; N, 7.10.

Example 14.—1 - hydroxy - 2 - (N - methyl-N-propargyl-amino)) - 1,3,4,6,11,11a - hexahydro - 2H - benzo[b]-quinolizine In 50 ml. benzene is dissolved 2.3 g. (0.01 mole) 1-hydroxy - 2 - N - methylamino - 1,3,4,6,11,11a - hexahydro-2H - benzo[b]quinolizine. Potassium carbonate (4 g., finely ground) is suspended and 1.19 g. (0.01 mole) propargyl bromide is slowly added. The mixture is refluxed 15 hours, filtered and the solvent evaporated. The residue is recrystallized from benzene to give 1-hydroxy-2-(N-methyl-N-propargylamino) - 1,3,4,6,11,11a - hexahydro-2H - benzo[b]quinolizine as a white solid, M.P. 156–158°.

Analysis.—Calcd. for $C_{17}H_{22}N_2O$ (percent): C, 75.51; H, 8.20; N, 10.37. Found (percent): C, 75.52; H, 8.36; N, 10.25.

Example 15.—1-hydroxy-2-N,N-dimethylamino-1,3,4,6,11,11a-hexahydro-2H-benzo[b]quinolizine In 4.6 g. (0.1 mole) formic acid and 3.25 g. (0.04 mole) 37% formaldehyde is dissolved 3.0 g. (0.0137 mole) 1 - hydroxy - 2 - amino-1,3,4,6,11,11a-hexahydro-2H-benzo[b]quinolizine. The solution is refluxed for 1.5 hours, solvents evaporated in vacuo, poured into water and made basic with $K_2CO_3$, extracted with chloroform, washed with water and dried. Removal of the solvent affords 1-hydroxy - 2 - N,N - dimethylamino - 1,3,4,6,11,11a-hexahydro-2H-benzo[b]quinolizine as a white solid which is recrystallized from petroleum ether, M.P. 104–105.5°.

*Analysis.*—Calcd. for $C_{15}H_{22}N_2O$ (percent): C, 73.12; H, 9.00; N, 11.37. Found (percent): C, 75.55; H, 9.04; N, 11.28.

We claim:

1. A compound selected from compounds of the formula

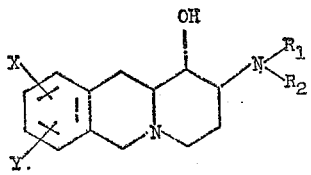

and pharmaceutically acceptable acid addition salts thereof in which X and Y are hydrogen, hydroxy, or methoxy and $R_1$ and $R_2$ are the same or different and are selected from hydrogen, a lower alkyl of 1 to 4 carbon atoms, a phenyl-lower alkyl of 7 to 13 carbon atoms 3,4-dimethoxybenzyl, and a lower alkynyl of 3 to 5 carbon atoms.

2. A compound of claim 1 in which X and Y are hydrogen or methoxy.

3. A compound of claim 1 in which $R_1$ and $R_2$ are hydrogen, lower alkyl of 1 to 4 carbon atoms or phenyl-lower alkyl.

4. The compound of claim 1 in which X, Y, $R_1$ and $R_2$ are hydrogen.

5. A compound of claim 1 in which X and Y are methoxy and $R_1$ and $R_2$ are hydrogen or methyl.

6. A compound of claim 1 in which X and Y are hydrogen or methoxy, $R_1$ is methyl and $R_2$ is hydrogen, methyl, 3,4-dimethoxybenzyl or propargyl.

7. The compound of claim 1 in which X and Y are hydrogen and $R_1$ and $R_2$ are methyl.

8. The compound of claim 1 in which X and Y are hydrogen, $R_1$ is methyl and $R_2$ is propargyl.

References Cited

UNITED STATES PATENTS

| | | | |
|---|---|---|---|
| 2,048,821 | 7/1936 | Schneider | 260—307 X |
| 3,026,331 | 3/1962 | Hoeksema et al. | 260—307 X |
| 3,408,352 | 10/1968 | Hardtmann | 260—288 |

OTHER REFERENCES

Kupchan et al.: Jour. Org. Chem., vol. 31, p. 1713 (1966).

Kupchan et al.: Jour. Org. Chem., vol. 31, 1707–12 (1966).

Archer: Jour. Org. Chem., vol. 16, pp. 430–31 (1951).

Kupchan et al.: Chem. Abstr., vol. 65, col. 3833 (1966).

DONALD G. DAUS, Primary Examiner

U.S. Cl. X.R.

260—286 R, 287 R, 288 A, 307 D; 424—258